(12) United States Patent
Albasateneh

(10) Patent No.: US 6,302,005 B1
(45) Date of Patent: Oct. 16, 2001

(54) PNEUMATIC BAR FEEDING APPARATUS FOR AUTOMATICALLY FEEDING A PLURALITY OF BAR STOCKS TO A LATHE OR THE LIKE DEVICE

(76) Inventor: Mouafak C. Albasateneh, 4961 Corso Cir., Cypress, CA (US) 90630

( * ) Notice: Subject to any disclaimer, the term of this patent is extended or adjusted under 35 U.S.C. 154(b) by 0 days.

(21) Appl. No.: 09/557,981

(22) Filed: Apr. 25, 2000

(51) Int. Cl.$^7$ .................................................. B23B 13/00
(52) U.S. Cl. .................................. 82/126; 82/127; 82/125
(58) Field of Search .............................. 82/126, 127, 125, 82/124; 414/14, 17, 18

(56) References Cited

U.S. PATENT DOCUMENTS

| | | |
|---|---|---|
| 3,760,661 | 9/1973 | Eichenhofer . |
| 3,780,924 | 12/1973 | Eichenhofer . |
| 3,823,628 | 7/1974 | Fortune . |
| 3,894,452 | 7/1975 | Kazik et al. . |
| 3,937,331 | 2/1976 | Spercel . |
| 4,088,230 | 5/1978 | Doe et al. . |
| 4,413,939 | 11/1983 | Peris . |
| 4,423,993 | 1/1984 | Eaton . |
| 4,766,788 | 8/1988 | Yashiki et al. . |
| 5,505,584 * | 4/1996 | Berns ................................ 414/745.1 |
| 5,881,617 | 3/1999 | Cucchi . |
| 5,890,407 * | 4/1999 | Drei ........................................ 82/126 |
| 6,024,002 * | 2/2000 | Ravaioli et al. ........................ 82/127 |
| 6,199,461 * | 3/2001 | Geiser .................................... 82/124 |

* cited by examiner

Primary Examiner—Henry Tsai
(74) Attorney, Agent, or Firm—Thomas I. Rozsa; Tony D. Chen; Jerry Fong

(57) ABSTRACT

An automatic pneumatic bar feeding apparatus for automatically feeding a plurality of bar stocks to a work station, such as a computer numerical control (CNC) machine for processing, thereby eliminating the need to reload the bar feeding apparatus with another bar stock one at a time. The bar feeding apparatus comprises a rotary which turns a loading unit 45° to a loading position for loading a bar stock onto the loading assembly from a holding tray. After the bar stock has been loaded onto the loading assembly, the rotary turns the loading assembly back to its initial position or feeding position. A pneumatic motor supplies air to a rear feeding assembly, wherein the feeding assembly pushes the bar stock to the work station for processing. When the feeding assembly has fed the majority of the bar stock into the CNC machine, the rotary turns the loading assembly back to the loading position. A hollow tube will then be aligned with the center of the CNC machine, where a rod slidably located within the hollow tube further pushes the excess bar stock into the CNC machine through the hollow tube until a sensor indicates that all of the bar stock has been processed by the CNC machine. When the feeding is completed, the feeding assembly returns to its initial position. During this feeding process, another bar stock is being loaded onto the loading assembly and when the previous bar stock has been successfully machined, the bar feeding apparatus will begin the process again with the new bar stock.

17 Claims, 5 Drawing Sheets

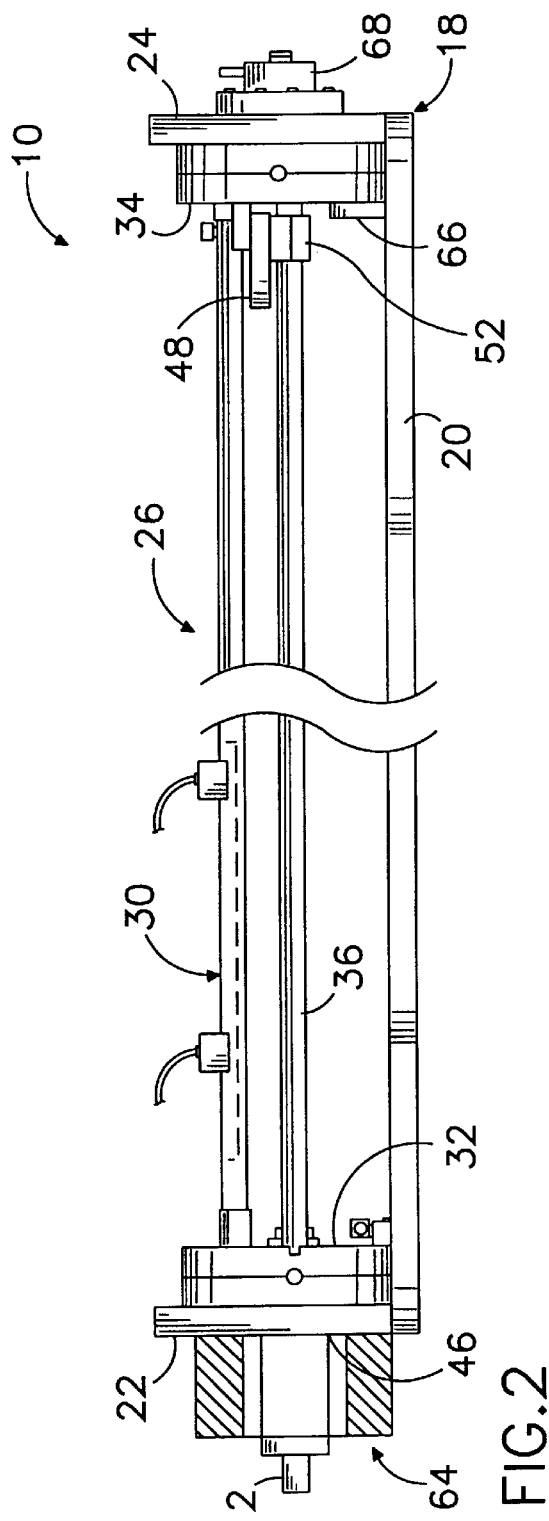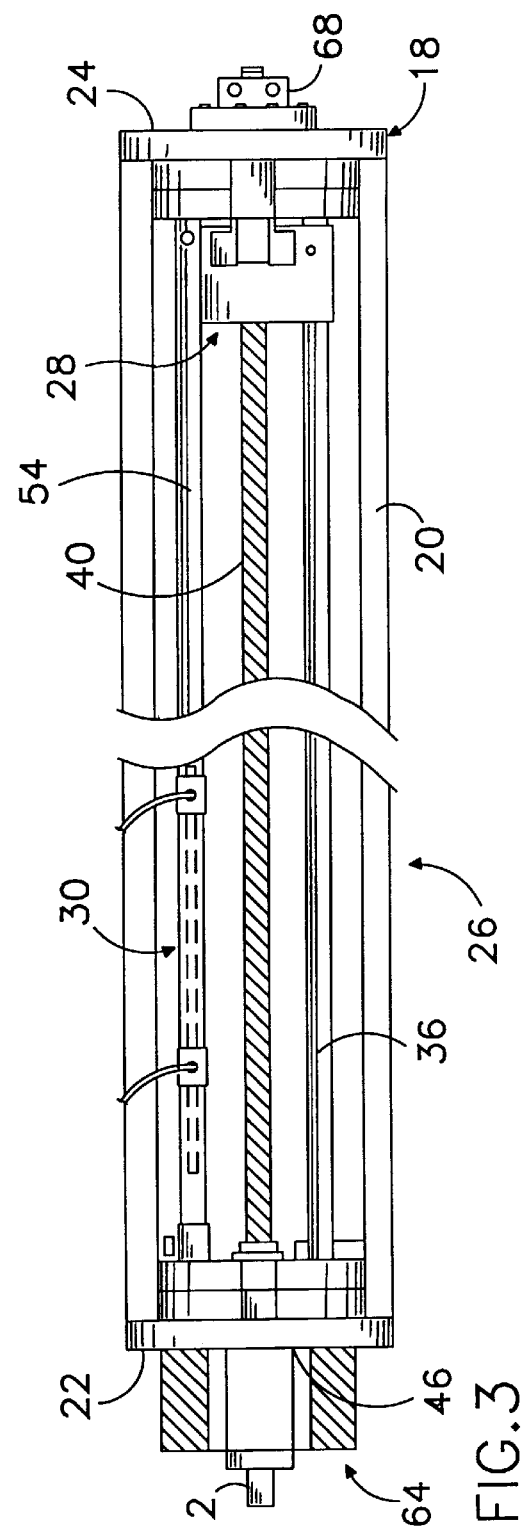

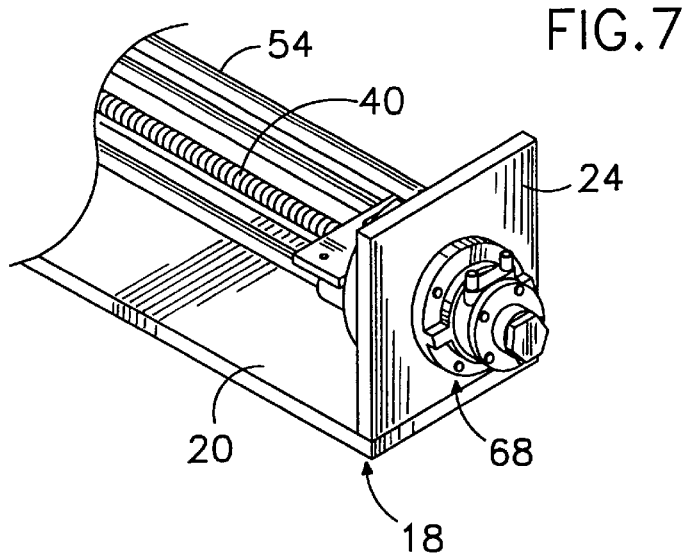
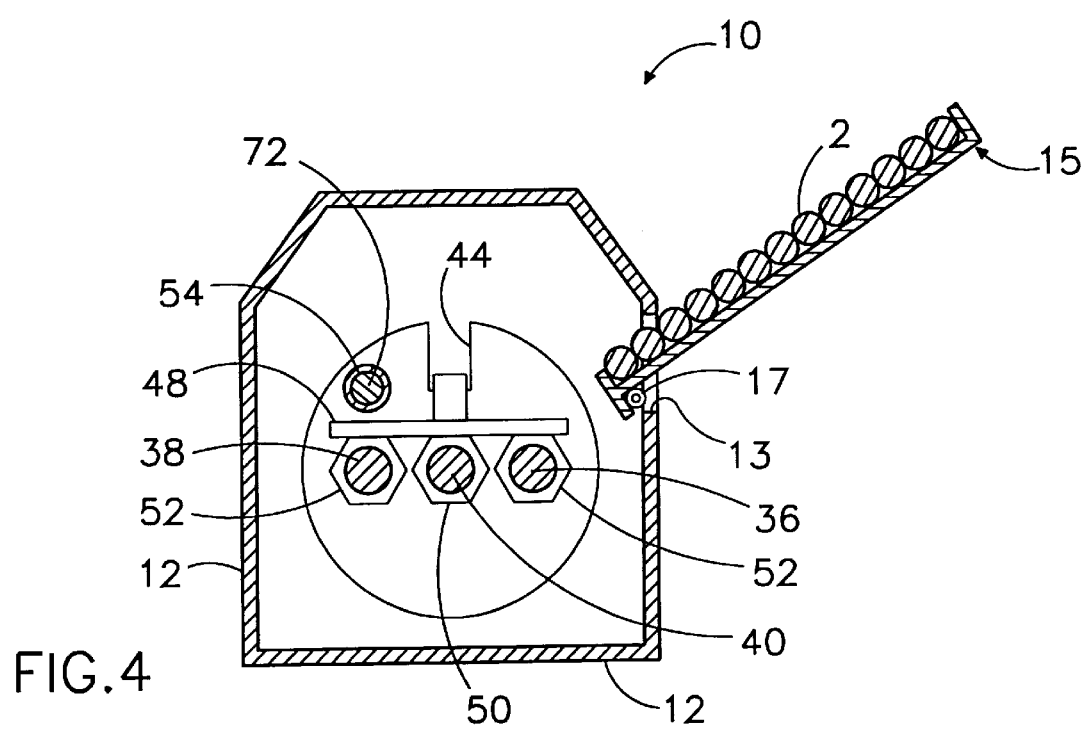

PNEUMATIC BAR FEEDING APPARATUS FOR AUTOMATICALLY FEEDING A PLURALITY OF BAR STOCKS TO A LATHE OR THE LIKE DEVICE

BACKGROUND OF THE INVENTION

1. Field of the Invention

The present invention generally relates to the field of bar feeders. More particularly, the present invention relates to the field of automatic pneumatic bar feeders for automatically feeding a plurality of bar stocks to a computer numerical control (CNC) machine or the like device.

2. Description of the Prior Art

Specifically, prior art feeding devices include an elongated bar support tube for receiving a length of bar stock and a pusher feed mechanism which is movable along the interior of the support tube, to feed the bar stock to a CNC machine or the like.

The following ten (10) prior art patents are found to be pertinent to the field of the present invention:

1. U.S. Pat. No. 3,760,661 issued to Eichenhofer on Sep. 25, 1973 for "Pneumatic Bar Feeder Control For Multiple Spindle Screw Machines" (hereafter "the '661 Eichenhofer Patent");

2. U.S. Pat. No. 3,780,924 issued to Eichenhofer on Dec. 25, 1973 for "Automatic Bar Feeder Attachment For Multiple Spindle Screw Machines" (hereafter "the '924 Eichenhofer Patent");

3. U.S. Pat. No. 3,823,628 issued to Fortune on Jul. 16, 1974 for "Raw Material Feeder System"(hereafter the "Fortune Patent");

4. U.S. Pat. No. 3,894,452 issued to Kazik et al. on Jul. 15, 1975 for "Control Arrangement For Multi-Spindle Automatic Screw Machine And The Like" (hereafter the "Kazik Patent");

5. U.S. Pat. No. 3,937,331 issued to Spercel on Feb. 10, 1976 for "Bar Stock Loader And Feed Mechanisms" (hereafter the "Spercel Patent");

6. U.S. Pat. No. 4,088,230 issued to Doe et al. on May 9, 1978 for "Control Means For A Bar Holder And Feeder Coupled To An Automatic Machine Tool" (hereafter the "Doe Patent");

7. U.S. Pat. No. 4,413,939 issued to Peris on Nov. 8, 1983 for "Bar Stock Feeder" (hereafter the "Peris Patent");

8. U.S. Pat. No. 4,423,993 issued to Eaton on Jan. 3, 1984 for "Retractable Bar Stock Feeder" (hereafter the "Eaton Patent");

9. U.S. Pat. No. 4,766,788 issued to Yashiki et al. on Aug. 30, 1988 for "Superprecision Lathe" (hereafter the "Yashiki Patent"); and 10. U.S. Pat. No. 5,881,617 issued to Cucchi on Mar. 16, 1999 for "Bar Feeder For Multi-Spindle Lathes, With Selective Drive" (hereafter the "Cucchi Patent").

The '661 Eichenhofer Patent discloses a pneumatic bar feeder control for multiple spindle screw machines. It comprises a drive roller bar feed moved by a cam system for engaging and advancing a bar during the feed cycle of the machine. The control system includes a stop to be engaged by the bar in an overfeed position, and a pneumatic cylinder for pushing the bar back from the overfeed position to a feed position. The pneumatic cylinder is controlled by an air valve operated by a cam follower moved by a surface of the cam means for a predetermined timed relation of the air valve with the movement with the driver roller.

The '924 Eichenhofer Patent discloses an automatic bar feeder attachment for multiple spindle screw machines. It comprises a drive motor which is mounted in a housing, with one end of the housing formed as a journal for journal mounting upon a support shaft forming part of the spindle machine. A drive roller is mounted upon the opposite end of the housing and driven constantly by a motor shaft. The roller is mounted upon an outer shaft which fits over and is secured to the motor shaft and which forms part of a cover which overlaps the housing and which is supported by bearings, thereby transmitting the transverse forces applied to the roller directly to the housing rather than solely to the motor shaft.

The Fortune Patent discloses a raw material feeder system for automatically feeding flexible stock. The feeder comprises an indexing drum which has a plurality of peripherally disposed, hollow tubes for housing raw stocks. Pneumatic pressure is used for periodically advancing each raw stock within the tubes into the automatic lathe for processing. When the work piece is finished, another portion of the stock is automatically advanced in the lathe.

The Kazik Patent discloses a control arrangement for multi-spindle automatic screw machine and the like. It comprises a rotary timing member which is driven by a motor via a gear arrangement with different speeds for work feeding and for quick-traverse movements.

The Spercel Patent discloses a bar stock loader and feed mechanisms. The loader mechanism is used with a machine tool having a chuck which is operated between opened and closed conditions. The bar feed mechanism has a feed gripper which is also opened and closed. The loader mechanism is operable to transfer one piece of bar stock at a time from an intermediate station to a loading station while simultaneously transferring another piece of bar stock from a magazine to the intermediate station. After the piece of bar stock has been moved to the loading station, the piece of bar stock is registered relative to the feed gripper and chuck by activating a compensating cylinder to press the leading end of the piece of bar stock against a stop member. When the stop member has been moved out of the way of the registered piece of bar stock, a main cylinder is activated to push the registered piece of bar stock into the open feed gripper and chuck.

The Doe Patent discloses a control means for a bar holder and feeder coupled to an automatic machine tool. The control means comprises counting means settable to a determined number, trip means operable when in a set position to trip the counting means once for each work piece machined, trigger means effective to move the trip means to the set position when a new length of bar is fed into the bar holder, and coupling means coupling the counting means to means controlling machining operation of the machine tool. The determined number is settable so that after a number of workpieces equal to the determined number have been machined from a length of bar preceding the new length of bar. The machine is stopped if the remnant of the length of bar is not of sufficient length to safely permit machining of a further workpiece.

The Peris Patent discloses a bar stock feeder which has both horizontal and vertical adjustment of the carrier standards and a quick acting locking and pneumatic connecting assembly for engaging the bar stock tube assembly which is supported and aligned on the standard by a retainer assembly.

The Eaton Patent discloses a retractable bar stock feeder. It has a pneumatic circuit with positive feed and vacuum circuits. The feeder uses an air pump to provide vacuum from a pressure line and is mounted within a single base pedestal to present a readily operable control panel. The feeder manually loads a stock of bar material.

The Yashiki Patent discloses a super precision lathe which has a main spindle mounted at one end of a vacuum chuck rotatably supported in an air bearing fixed on a head stock. The main spindle has a first vacuum passage connected to the vacuum chuck and is opened at the outer surface of the main spindle, a second vacuum passage formed in the head stock and of which an open end is connected to a vacuum pump and which is opened at the inner surface of the air bearing. The first vacuum passage connects the second vacuum passage through an interconnection region defined by two annular grooves formed at opposite positions of the outer surface of the main spindle and the inner surface of the air bearing.

The Cucchi Patent discloses a bar feeder for multi-spindle lathes, with selective drive. It comprises a rotating drum with a plurality of guides for the bars, which longitudinally extend in different angular positions on the outer surface of the drum. Bar pushing members are slidably arranged at one end and are supported to rotate coplanarly with the drum around a central pinion gear connected to a drive motor. This is more of a mechanical bar feeder.

It is highly desirable to have a very efficient and also very effective design and construction of a pneumatic bar feeding apparatus for automatically feeding a plurality of bar stocks to a CNC machine or the like device, thereby eliminating the need to reload the bar feeding apparatus with another bar stock one at a time. It is desirable to provide a pneumatic bar feeding apparatus that is not noisy and does not vibrate, and is maintenance free. It is also desirable to provide a pneumatic bar feeding apparatus that allows for fast production with no wasted material.

SUMMARY OF THE INVENTION

The present invention is an automatic pneumatic bar feeding apparatus for automatically feeding a plurality of bar stocks to a work station, such as a computer numerical control (CNC) machine or the like device for processing, thereby eliminating the need to reload the bar feeding apparatus with another bar stock one at a time.

The bar feeding apparatus is housed in a housing. The bar feeding apparatus comprises a rotary which turns a loading assembly 45° to a loading position for loading a bar stock onto the loading assembly from a holding tray. After the bar stock has been loaded onto the loading assembly, the rotary turns the loading assembly back to its initial position or feeding position. A pneumatic motor supplies air to a feeding assembly, wherein the feeding assembly pushes the bar stock to the work station for processing. When the feeding assembly has fed the majority of the bar stock into the CNC machine, the rotary turns the loading assembly back to the loading position. A hollow tube will then be aligned with the center of the CNC machine, where an elongated rod or shaft is slidably located within the hollow tube, which further pushes the excess bar stock into the CNC machine through the hollow tube until a sensor indicates that all of the bar stock has been processed by the CNC machine. When the feeding is completed, the feeding assembly returns to its initial position. During this feeding process, another bar stock is being loaded onto the loading assembly and when the previous bar stock has been successfully machined, the bar feeding apparatus will begin the process again with the new bar stock.

It is an object of the present invention to provide an automatic pneumatic bar feeding apparatus which does not generate noise and vibration.

It is an additional object of the present invention to provide an automatic pneumatic bar feeding apparatus which includes a final stock feeding assembly wherein the final stock feeding assembly further assists in advancing the excess bar stock from the bar feeding apparatus so that no wasted material is left in the apparatus.

It is a further object of the present invention to provide an automatic pneumatic bar feeding apparatus which is maintenance free.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated:

FIG. 2 is a side elevational view of the present invention automatic pneumatic bar feeding apparatus without the housing;

FIG. 3 is a top plan view of the present invention automatic pneumatic bar feeding apparatus without the housing;

FIG. 4 is a cross-sectional view taken along line 4—4 of FIG. 1;

FIG. 7 is a partial rear perspective view of the present invention automatic pneumatic bar feeding apparatus showing a pneumatic motor;

DETAILED DESCRIPTION OF THE PREFERRED EMBODIMENTS

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

For clarity purposes in these figures, cabling, electrical wiring and tubing are not illustrated, but are conventional in the art and would be easily accomplished by persons skilled in the art.

Figure 1:
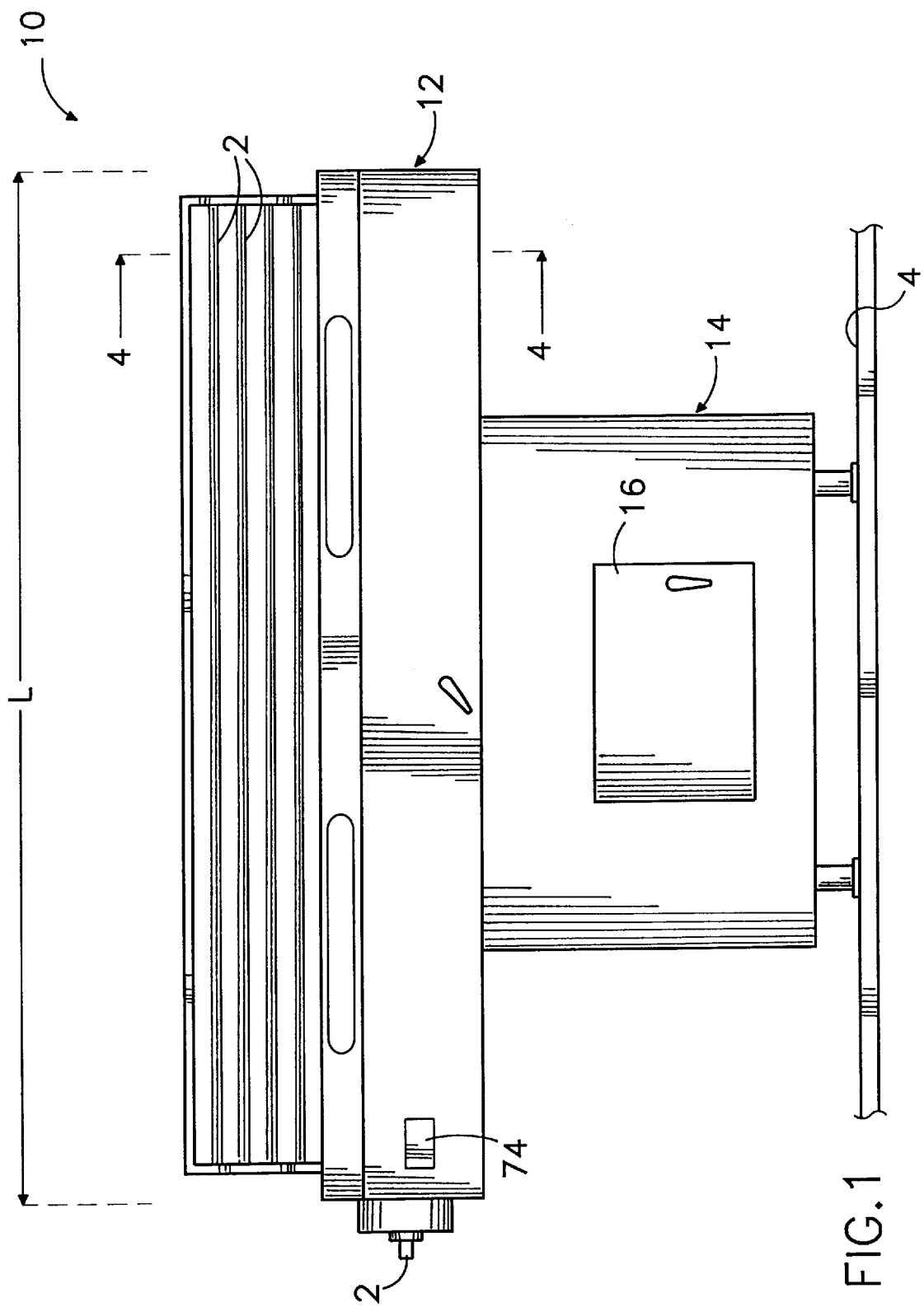
FIG. 1 is a front elevational view of the present invention automatic pneumatic bar feeding apparatus.
Figure 5:
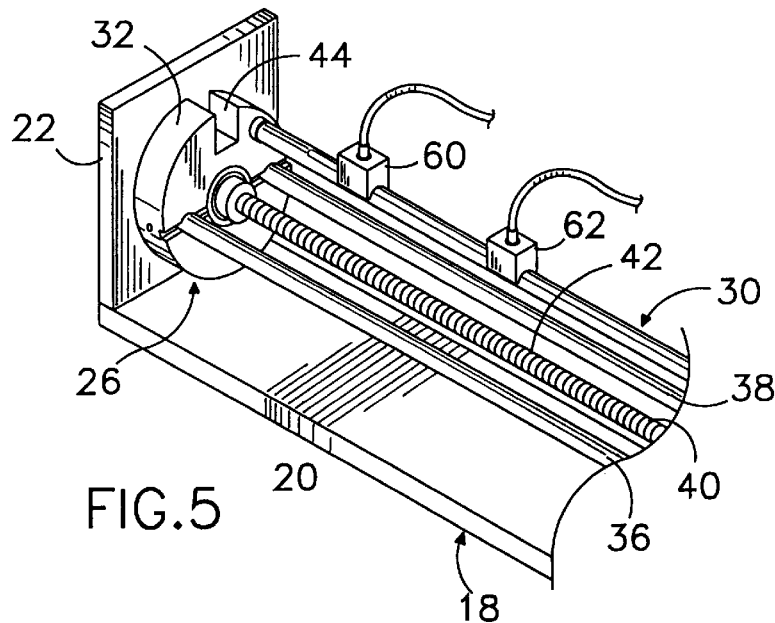
FIG. 5 is a partial front perspective view of the present invention automatic pneumatic bar feeding apparatus shown in its feeding position.
Figure 6:
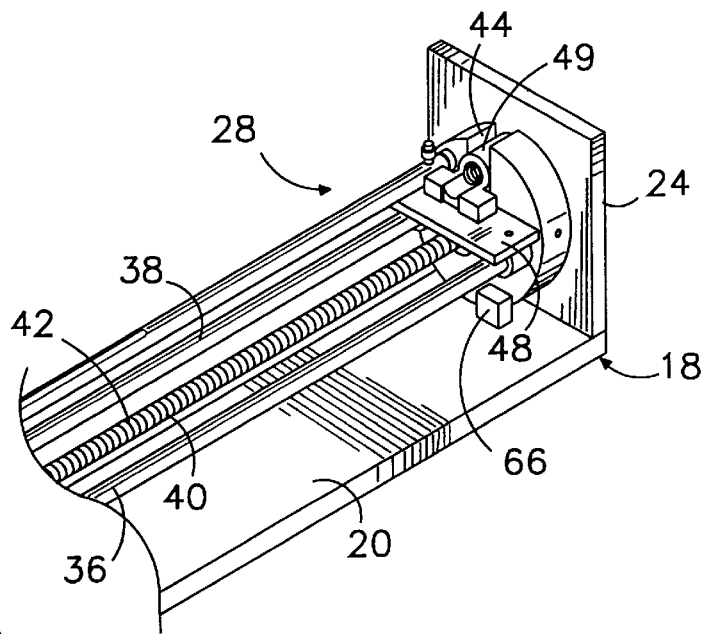
FIG. 6 is a partial rear perspective view of the present invention automatic pneumatic bar feeding apparatus shown in its feeding position.
Figure 8:
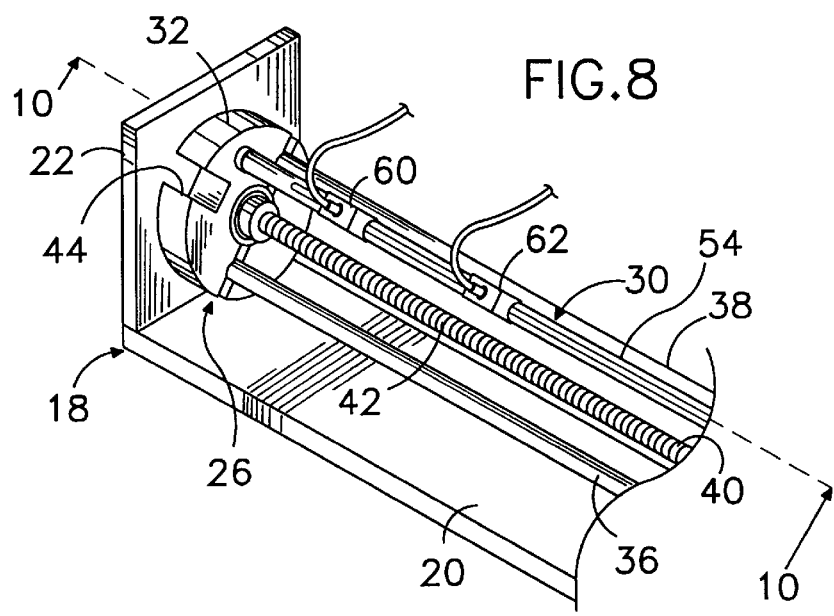
FIG. 8 is a partial front perspective view of the present invention automatic pneumatic bar feeding apparatus shown in its loading position.
Figure 10:
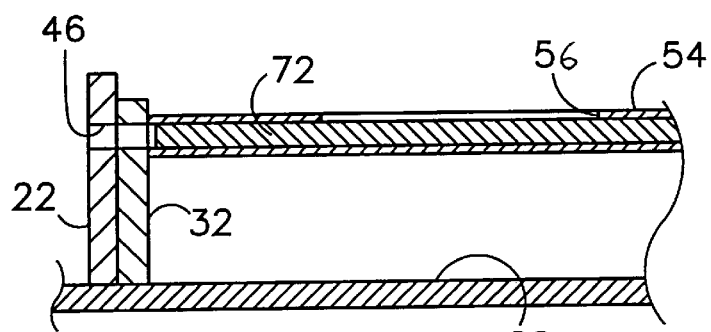
FIG. 10 is a partial cross-sectional taken along line 10—10 of FIG. 8.
Figure 9:
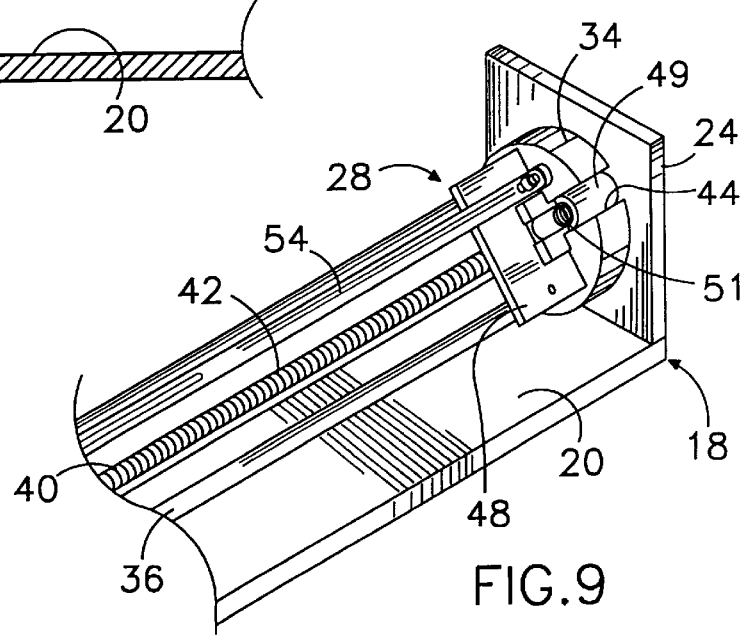
FIG. 9 is a partial rear perspective view of the present invention automatic pneumatic bar feeding apparatus shown in its loading position.

Referring to FIG. 1, there is shown at 10 the present invention automatic pneumatic bar feeding apparatus which is used with and positioned behind a work station, such as a computer numerical control (CNC) machine (not shown) or the like device for processing a length of bar stock 2. The bar feeding apparatus 10 automatically feeds a plurality of bar stocks to the CNC machine for processing and thereby eliminates the need to reload the bar feeding apparatus 10 with another bar stock one at a time.

By way of example, the overall length (L) of the present invention bar feeding apparatus may be approximately six (6) feet or twelve (12) feet. It will be appreciated that the dimensions described above are merely one illustrative embodiment and can include many other comparable sets of dimensions.

Referring to FIGS. 1 and 4, the bar feeding apparatus 10 is housed in a housing 12 and supported by a stand 14 resting on the floor 4. The housing 12 has a longitudinal slit 13 located on the rear of the housing 12 for accommodating an elongated loading tray 15, where the loading tray 15 holds a plurality of elongated bar stocks 2 to be loaded to the bar feeding apparatus so that each bar stock can be worked on by the CNC machine. The loading tray 15 has a dual pin release mechanism 17 or any other suitable means for allowing one bar stock 2 to be loaded one at a time to the bar feeding apparatus 10. The stand 14 has an access door 16 which can be opened into a storage space area underneath the housing 12.

Referring to FIGS. 2 through 9, the bar feeding apparatus 10 has an elongated rectangular shaped structure 18 which includes a base 20 and two opposite end walls 22 and 24 attached to the base 20. The bar feeding apparatus includes a loading assembly 26, a rear bezel stock feeding assembly 28 and a final stock feeding assembly 30 which are all mounted within the structure 18.

The loading assembly 26 comprises a pair of circular disc members 32 and 34 attached together on their interior surfaces by a pair of spaced apart elongated parallel cylindrical support bars 36 and 38. The length of the loading assembly 26 is long enough to allow a standard size length of bar stock 2 to be received therein. The loading assembly 26 is mounted within the rectangular shaped structure 18 such that the pair of circular disc members 32 and 34 are respectively located adjacent to the two end walls 22 and 24. Each circular disc member has a U-shaped slot 44 located on top. The U-shaped slot 44 on the circular disc member 32 is aligned with a central opening 46 provided on the front end wall 22 of the structure 18 so that the bar stock 2 may be fed to the work station.

A rotatable screw driving shaft 40 is also rotatably attached between the circular disc members 32 and 34, and centrally located for automatically driving the rear bezel stock feeding assembly 28 in a longitudinal direction for feeding the bar stock 2 to the work station. The screw driving shaft 40 has exterior screw threads 42 thereon.

The rear bezel stock feeding assembly 28 comprises a bar stock holding chamber 49 which is mounted to a horizontal support plate 48 which is movable in the longitudinal direction. The bar stock holding chamber 49 is situated within the U-shaped slot 44 of the circular disc member 34. An internal spring 51 is provided with the rear bezel stock feeding assembly 28 and is installed within the holding chamber 49. A ball screw 50 is centrally affixed underneath the support plate 48. Two slidable sleeves 52 are also affixed underneath the support plate 48 and located on opposite sides of the ball screw 50. The two slidable sleeves 52 are respectively installed on the two parallel cylindrical support bars 36 and 38 for supporting the support plate 48 while the ball screw 50 is installed on the screw driving shaft 40 for longitudinal movement of the rear bezel stock feeding assembly 28 to feed the bar stock 2 to the processing station.

Referring to FIGS. 2 through 10, the final stock feeding assembly 30 includes an elongated hollow cylindrical tube 54 and an elongated slidable rod or shaft 72. The ends of the cylindrical tube 54 are affixed on the interior surfaces of the circular disc member 32 and 34, and located above the cylindrical support bar 38. The slidable rod 72 is disposed within the cylindrical tube 54 and extends the length of the tube 54. The slidable rod 72 is movable in the longitudinal direction by fluid or air pressure from a pneumatic motor 68. A pair of adjustable sensors 60 and 62 are remotely mounted on the hollow cylindrical tube 54 and located adjacent to a slot 56. The sensors 60 and 62 are electrically connected to a controller 74 (see FIG. 1) which controls the logic operations of the bar feeding apparatus 10. The first sensor 60 senses the position of the rod 72 and provides information to the controller 74 that all of the bar stock 2 has been fed to the work station. The second sensor 62 senses the position of the rod 72 and provides information to the controller 74 that the rod 72 is at its initial position and that the loading assembly 26 is ready for another bar stock, so that the bar feeding apparatus will begin the process again.

The controller 74 is mounted on the housing 12 for controlling the logic operations of the bar feeding apparatus 10. The controller 74 may include a microprocessor with supporting circuitry, modular relays with supporting circuitry or any other type of circuitry know to one skilled in the art and may be programmed to perform the task at hand.

Referring to FIGS. 2 and 3, there is shown a collet or stock tail holder 64 for gripping or holding the front end of the bar stock 2 thereto. The collet 64 is rotatably mounted on the front end wall 22 of the structure 18 by conventional means and is located outside of the housing 12. The end of the bar stock 2 passes through the central opening 46 on the front end wall 22 of the structure 18 and into the collet 64, where the collet 64 is automatically opened and closed by the controller 74 and when closed rotates the bar stock 2 at a predetermined cutting velocity. A portion of the bar stock 2 is shown, extending from the tip of the collet 64. When the collet 64 is in the open condition, the interior gripping surface defines an inside diameter approximately 0–2 inches for holding the cylindrical outer surface of the bar stock 2. During operation of the bar feeding apparatus 10, the collet 64 rotates the entire bar stock 2 in the loading assembly 26 as the front end of the bar stock 2 is being work on by the tools at the work station.

Referring to FIGS. 2 through 9, the bar feeding apparatus 10 further comprises a rotary 66 which is convention in the art and is mounted on the circular disc member 34 and when activated rotates the loading assembly 26 45° to a loading or second position (see FIGS. 8 and 9) for loading a bar stock 2 onto the loading assembly 26 from the loading tray 15. After the bar stock 2 has been loaded onto the loading assembly 26, the rotary 66 rotates the loading assembly 26 back to its feeding or first position (see FIGS. 5 and 6). The pneumatic motor 68 is mounted on the exterior surface of the rear end wall 24 and supplies power to the screw driving shaft 40. As the screw driving shaft 40 is rotated, the ball screw 50 moves on the screw driving shaft 40 in the longitudinal direction, which in turns moves the rear bezel stock feeding assembly 28 such that the bar stock holding chamber 49 pushes the bar stock 2 to the work station for processing. When the rear bezel feeding assembly 28 has fed the majority of the bar stock 2 into the CNC machine, the rotary 66 is activated to rotate the loading assembly 26 back to the loading position. The hollow tube 54 will then be aligned with the central opening 46 on the front end wall 22, where the rod 72 is slidably located within the hollow tube 54 to further push the excess bar stock 2 into the CNC machine through the hollow tube 54 until the sensor 60 indicates that all of the bar stock 2 has been processed by the CNC machine. When the feeding is completed, the rear bezel stock feeding assembly 28 returns to its initial or feeding position. During this feeding process, another bar stock 2 is being loaded onto the loading assembly 26 and when the previous bar stock 2 has been successfully processed, the bar feeding apparatus 10 will begin the process again with the new bar stock 2.

The rear bezel stock feeding assembly 28 is in a stowed position when there are no bar stocks in the bar feeding apparatus 10. When a bar stock 2 is loaded and is sensed by a micro-sensor located within the holding chamber 49, the pneumatic motor 68 is activated to power the screw driving shaft 40. This causes the rear bezel stock feeding assembly 28 to move out of its stowed position and the holding chamber 49 comes in contact with the end of the bar stock 2. The holding chamber 49 begins to push the rear end of the bar stock so that the front end goes into the CNC lathe for processing. When the collet 64 is closed on the bar stock, the bar stock cannot move forward. The screw driving shaft 40 continues driving the rear bezel stock feeding assembly 28 forward and forces the internal spring 51 within the holding chamber 49 to compress. At a certain preset point during this compression cycle, another micro-sensor is activated and turns off the pneumatic motor 68 which supplies power to the screw driving shaft The internal spring 51 is still compressed and thus maintains a constant pressure on the holding chamber 49, which continues to hold the bar stock as it is rotating in the loading assembly 26. The internal spring 51, which is still compressed and is pushing on the rear end of the bar stock has enough force to begin feeding the bar stock into the CNC lathe. When the CNC lathe is finished with the part it is making, the collet 64 will release its hold on the bar stock (per the lathe program) and the bar stock will start feeding into the CNC lathe from the pressure applied by the compressed internal spring 51. When the internal spring 51 has pushed bar stock a short distance, a micro sensor is activated and the screw driving shaft 40 for the rear bezel stock feeding assembly 28 is turned on. The bar stock is then being pushed by the rear bezel stock feeding assembly 28 as it is being driven by the screw driving shaft 40. When the CNC lathe program closes the collet 64, the process starts over again.

Defined in detail, the present invention is an automatic bar feeding apparatus for automatically feeding a plurality of bar stocks to a processing machine one at a time for processing, the apparatus comprising: (a) a loading assembly, a rear bezel stock feeding assembly and a final feeding assembly all housed within an elongated structure having a base and two end walls located at opposite ends and attached to the base; (b) a stock tail holder rotatably mounted to a respective one of the two end walls of the structure for gripping one end of one of the plurality of bar stocks and operable between an open condition and a closed condition; (c) a loading tray located behind the structure for retaining the plurality of bar stocks and having means for allowing one bar stock to be loaded one at a time to the loading assembly; (d) the loading assembly rotatable to a loading position for loading one of the plurality of bar stocks and when the loading assembly has been loaded with the bar stock, the loading assembly rotates to a feeding position for processing the bar stock to the processing machine; (e) the rear bezel stock feeding assembly including a holding chamber and a compressing spring installed within the holding chamber for retaining a rear end of the bar stock thereto; (f) a rotatable screw driving shaft connected to the rear bezel stock feeding assembly for longitudinally moving the holding chamber which in turn moves the bar stock to the processing machine for processing; (g) the final feeding assembly including an elongated rod slidable disposed within a hollow cylindrical tube which is mounted parallel to the loading assembly; (h) the loading assembly rotatable to the loading position such that the hollow cylindrical tube is aligned with a central opening on the respective one of the two end walls so that when the rod is activated, the rod further pushes the excess bar stock into the processing machine through the hollow cylindrical tube so that no material of the bar stock is left within the apparatus, and when the rod is deactivated, the rod returns to its initial position; (i) an adjustable first sensor for sensing and indicating that all of the bar stock has been processed; (j) an adjustable second sensor for sensing and detecting that the rod has returned to its initial position, and during the current cycle another bar stock is being loaded onto the loading assembly and a new processing cycle begins for the another bar stock; and (k) means for supplying power to the rotatable driving shaft which in turn longitudinally moves the rear feeding assembly, the means further supplying fluid under pressure within the hollow cylindrical tube to thereby cause the slidable rod to advance longitudinally within the hollow tube, which in turn pushes the excess bar stock into the processing machine, and the means further reversing the pressure so that a suction is formed within the hollow cylindrical tube to withdraw the slidable rod back to its initial position; (l) whereby during the current processing cycle, another bar stock is being loaded onto the loading assembly and when the previous bar stock has been successfully machined, the apparatus begins the new processing cycle for another bar stock.

Defined broadly, the present invention is an automatic bar feeding apparatus for automatically feeding a plurality of bar stocks to a processing machine one at a time for processing, the apparatus comprising: (a) a loading assembly, a rear feeding assembly and a final feeding assembly all installed within a structure having a base and two end walls located at opposite ends and attached to the base; (b) a collet rotatably mounted to a respective one of the two end walls of the structure for gripping one end of one of the plurality of bar stocks and operable between an open condition and a closed condition; (c) a loading tray for retaining the plurality of bar stocks and having means for allowing a respective one of the plurality of bar stocks to be loaded one at a time to the loading assembly; (d) the loading assembly rotatable to a loading position for loading the bar stock and when the loading assembly has been loaded with the bar stock, the loading assembly rotates to a feeding position for processing the bar stock to the processing machine; (e) the rear feeding assembly including a holding chamber and a compressing spring installed within the holding chamber for retaining a rear end of the bar stock thereto; (f) a driving shaft connected to the rear feeding assembly for longitudinally moving the holding chamber which in turn moves the bar stock to the processing machine for processing; (g) the final feeding assembly including a rod disposed within a hollow shaft which is mounted parallel to the loading assembly; (h) the loading assembly rotatable to the loading position such that the hollow shaft is aligned with a central opening on the respective one of the two end walls so that when the rod is activated, the rod further pushes the excess bar stock into the processing machine through the hollow shaft so that no material of the bar stock is left within the apparatus, and when the rod is deactivated, the rod returns to its initial position; (i) means for sensing that all of the bar stock has been processed by the processing machine and when the rod has returned to its initial position, and during the current cycle another bar stock is being loaded onto the loading assembly and a new processing cycle begins for another bar stock; and (j) means for supplying power to the driving shaft which in turn longitudinally moves the rear feeding assembly, the means further supplying fluid under pressure within the hollow shaft to thereby cause the rod to advance longitudinally within the hollow shaft, which in turn pushes the excess bar stock into the processing machine, and the means further reversing the pressure so that a suction is formed within the hollow shaft to withdraw the rod back to its initial position; (k) whereby during the current processing cycle, another bar stock is loaded onto the loading assembly and when the previous bar stock has been successfully machined, the apparatus begins the new processing cycle for another bar stock.

Defined more broadly, the present invention is a bar feeding apparatus for automatically feeding a plurality of bar stocks to a processing machine one at a time for processing, the apparatus comprising: (a) a collet for gripping one end of a bar stock therein and operable between an open condition and a closed condition; (b) a loading tray for retaining the plurality of bar stocks and loading one bar stock one at a time; (c) a loading assembly rotatable to a loading position for loading the bar stock and when the loading assembly has been loaded with the bar stock, the loading assembly rotates to a feeding position for processing the bar stock to the processing machine; (d) a first feeding mechanism for longitudinally advancing the bar stock to the processing machine for processing; (e) a second feeding mechanism for further pushing the excess bar stock into the processing machine so that no material of the bar stock is left within the apparatus, and when the second feeding mechanism is deactivated, the second feeding mechanism returns to its initial position; (f) means for sensing and indicating that all of the bar stock has been processed by the processing machine and when the second feeding mechanism has returned to its initial position, and during the cycle a new bar stock is being loaded onto the loading assembly and a new processing cycle begins for the new bar stock; and (g) means for supplying fluid under pressure to thereby cause the second feeding mechanism to advance longitudinally, which in turn pushes the excess bar stock into the processing machine, and the means further reversing the pressure so that a suction is formed to withdraw the second feeding mechanism back to its initial position; (h) whereby during the old processing cycle, the new bar stock is loaded onto the loading assembly and when the previous bar stock has been successfully machined, the apparatus begins the new processing cycle for the new bar stock.

Of course the present invention is not intended to be restricted to any particular form or arrangement, or any specific embodiment, or any specific use, disclosed herein, since the same may be modified in various particulars or relations without departing from the spirit or scope of the claimed invention hereinabove shown and described of which the apparatus or method shown is intended only for illustration and disclosure of an operative embodiment and not to show all of the various forms or modifications in which this invention might be embodied or operated.

The present invention has been described in considerable detail in order to comply with the patent laws by providing full public disclosure of at least one of its forms. However, such detailed description is not intended in any way to limit the broad features or principles of the present invention, or the scope of the patent to be granted. Therefore, the invention is to be limited only by the scope of the appended claims.

What is claimed is:

1. An automatic bar feeding apparatus for automatically feeding a plurality of bar stocks to a processing machine one at a time for processing, the apparatus comprising:

a. a loading assembly, a rear bezel stock feeding assembly and a final feeding assembly all housed within an elongated structure having a base and two end walls located at opposite ends and attached to the base;

b. a stock tail holder rotatably mounted to a respective one of said two end walls of said structure for gripping one end of one of said plurality of bar stocks and operable between an open condition and a closed condition;

c. a loading tray located behind said structure for retaining said plurality of bar stocks and having means for allowing one bar stock to be loaded one at a time to said loading assembly;

d. said loading assembly rotatable to a loading position for loading one of said plurality of bar stocks and when said loading assembly has been loaded with the bar stock, the loading assembly rotates to a feeding position for processing the bar stock to said processing machine;

e. said rear bezel stock feeding assembly including a holding chamber and a compressing spring installed within the holding chamber for retaining a rear end of the bar stock thereto;

f. a rotatable screw driving shaft connected to said rear bezel stock feeding assembly for longitudinally moving said holding chamber which in turn moves the bar stock to said processing machine for processing;

g. said final feeding assembly including an elongated rod slidable disposed within a hollow cylindrical tube which is mounted parallel to said loading assembly;

h. said loading assembly rotatable to said loading position such that said hollow cylindrical tube is aligned with a central opening on said respective one of said two end walls so that when said rod is activated, said rod further pushes the excess bar stock into said processing machine through said hollow cylindrical tube so that no material of the bar stock is left within said apparatus, and when said rod is deactivated, said rod returns to its initial position;

i. an adjustable first sensor for sensing and indicating that all of the bar stock has been processed;

j. an adjustable second sensor for sensing and detecting that said rod has returned to its initial position, and during the current cycle another bar stock is being loaded onto said loading assembly and a new processing cycle begins for the another bar stock; and k. means for supplying power to said rotatable driving shaft which in turn longitudinally moves said rear feeding assembly, said means further supplying fluid under pressure within said hollow cylindrical tube to thereby cause said slidable rod to advance longitudinally within said hollow tube, which in turn pushes the excess bar stock into said processing machine, and said means further reversing the pressure so that a suction is formed within said hollow cylindrical tube to withdraw said slidable rod back to its initial position;

l. whereby during the current processing cycle, another bar stock is being loaded onto said loading assembly and when the previous bar stock has been successfully machined, said apparatus begins the new processing cycle for another bar stock.

2. The bar feeding apparatus in accordance with claim 1, further comprising a rotary for rotating said loading assembly between said loading position and said feeding position.

3. The bar feeding apparatus in accordance with claim 1, further comprising a controller for controlling the logic operations of said bar feeding apparatus.

4. The bar feeding apparatus in accordance with claim 1, wherein said means for allowing one bar stock to be loaded one at a time to said bar feeding apparatus includes a dual pin mechanism.

5. An automatic bar feeding apparatus for automatically feeding a plurality of bar stocks to a processing machine one at a time for processing, the apparatus comprising:
   a. a loading assembly, a rear feeding assembly and a final feeding assembly all installed within a structure having a base and two end walls located at opposite ends and attached to the base;
   b. a collet rotatably mounted to a respective one of said two end walls of said structure for gripping one end of one of said plurality of bar stocks and operable between an open condition and a closed condition;
   c. a loading tray for retaining said plurality of bar stocks and having means for allowing a respective one of said plurality of bar stocks to be loaded one at a time to said loading assembly;
   d. said loading assembly rotatable to a loading position for loading the bar stock and when said loading assembly has been loaded with the bar stock, said loading assembly rotates to a feeding position for processing the bar stock to said processing machine;
   e. said rear feeding assembly including a holding chamber and a compressing spring installed within the holding chamber for retaining a rear end of the bar stock thereto;
   f. a driving shaft connected to said rear feeding assembly for longitudinally moving said holding chamber which in turn moves the bar stock to said processing machine for processing;
   g. said final feeding assembly including a rod disposed within a hollow shaft which is mounted parallel to said loading assembly;
   h. said loading assembly rotatable to said loading position such that said hollow shaft is aligned with a central opening on said respective one of said two end walls so that when said rod is activated, said rod further pushes the excess bar stock into said processing machine through said hollow shaft so that no material of the bar stock is left within said apparatus, and when said rod is deactivated, said rod returns to its initial position;
   i. means for sensing that all of the bar stock has been processed by said processing machine and when said rod has returned to its initial position, and during the current cycle another bar stock is being loaded onto said loading assembly and a new processing cycle begins for another bar stock; and
   j. means for supplying power to said driving shaft which in turn longitudinally moves said rear feeding assembly, said means further supplying fluid under pressure within said hollow shaft to thereby cause said rod to advance longitudinally within said hollow shaft, which in turn pushes the excess bar stock into said processing machine, and said means further reversing the pressure so that a suction is formed within said hollow shaft to withdraw said rod back to its initial position;
   k. whereby during the current processing cycle, another bar stock is loaded onto said loading assembly and when the previous bar stock has been successfully machined, the apparatus begins the new processing cycle for another bar stock.

6. The bar feeding apparatus in accordance with claim 5, further comprising a rotary for rotating said loading assembly between said loading position and said feeding position.

7. The bar feeding apparatus in accordance with claim 5, further comprising a controller for controlling the logic operations of said bar feeding apparatus.

8. The bar feeding apparatus in accordance with claim 5, wherein said means for allowing one bar stock to be loaded one at a time to said bar feeding apparatus includes a dual pin mechanism.

9. The bar feeding apparatus in accordance with claim 5, wherein said sensing and indicating means include an adjustable first sensor for sensing and indicating that all of the bar stock has been processed and an adjustable second sensor for sensing and detecting that said slidable rod has returned to its initial position.

10. A bar feeding apparatus for automatically feeding a plurality of bar stocks to a processing machine one at a time for processing, the apparatus comprising:
    a. a collet for gripping one end of a bar stock therein and operable between an open condition and a closed condition;
    b. a loading tray for retaining said plurality of bar stocks and loading one bar stock one at a time;
    c. a loading assembly rotatable to a loading position for loading the bar stock and when the loading assembly has been loaded with the bar stock, the loading assembly rotates to a feeding position for processing the bar stock to said processing machine;
    d. a first feeding mechanism for longitudinally advancing the bar stock to said processing machine for processing;
    e. a second feeding mechanism for further pushing the excess bar stock into said processing machine so that no material of the bar stock is left within said apparatus, and when the second feeding mechanism is deactivated, said second feeding mechanism returns to its initial position;
    f. means for sensing and indicating that all of the bar stock has been processed by said processing machine and when said second feeding mechanism has returned to its initial position, and during the cycle a new bar stock is being loaded onto said loading assembly and a new processing cycle begins for the new bar stock; and
    g. means for supplying fluid under pressure to thereby cause said second feeding mechanism to advance longitudinally, which in turn pushes the excess bar stock into said processing machine, and said means further reversing the pressure so that a suction is formed to withdraw said second feeding mechanism back to its initial position;
    h. whereby during the old processing cycle, the new bar stock is loaded onto said loading assembly and when the previous bar stock has been successfully machined, the apparatus begins the new processing cycle for the new bar stock.

11. The bar feeding apparatus in accordance with claim 10, further comprising a rotary for rotating said loading assembly between said loading position and said feeding position.

12. The bar feeding apparatus in accordance with claim 10, further comprising a controller for controlling the logic operations of said bar feeding apparatus.

13. The bar feeding apparatus in accordance with claim 10, wherein said loading assembly comprises a U-shaped slot at each end of said loading assembly for respectively accommodating ends of said bar stock.

14. The bar feeding apparatus in accordance with claim 10, wherein said loading tray further comprises means for allowing one bar stock to be loaded one at a time to said loading assembly.

15. The bar feeding apparatus in accordance with claim 14, wherein said means for allowing one bar stock to be loaded one at a time to said bar feeding apparatus includes a dual pin mechanism.

16. The bar feeding apparatus in accordance with claim 10, wherein said sensing and indicating means include a first sensor for sensing and indicating that all of the bar stock has been processed and a second sensor for sensing and detecting that said final feeding mechanism has returned to its initial position.

17. The bar feeding apparatus in accordance with claim 10, wherein said final feeding mechanism further comprises a slidable rod disposed within a hollow tube.

* * * * *